US012700168B2

(12) United States Patent
Guizilini et al.

(10) Patent No.: US 12,700,168 B2
(45) Date of Patent: Aug. 4, 2026

(54) SHARED LATENT SPACES FOR VOLUMETRIC RENDERING

(71) Applicants: Toyota Research Institute, Inc., Los Altos, CA (US); Massachusetts Institute of Technology, Cambridge, MA (US)

(72) Inventors: Vitor Guizilini, Santa Clara, CA (US); Rares A. Ambrus, San Francisco, CA (US); Jiading Fang, Chicago, IL (US); Sergey Zakharov, San Francisco, CA (US); Vincent Sitzmann, Cambridge, MA (US); Igor Vasiljevic, Pacifica, CA (US); Adrien Gaidon, San Jose, CA (US)

(73) Assignees: TOYOTA RESEARCH INSTITUTE, INC., Los Altos, CA (US); TOYOTA JIDOSHA KABUSHIKI KAISHA, Toyota (JP); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 336 days.

(21) Appl. No.: 18/364,922

(22) Filed: Aug. 3, 2023

(65) Prior Publication Data

US 2024/0161510 A1     May 16, 2024

Related U.S. Application Data

(60) Provisional application No. 63/382,776, filed on Nov. 8, 2022.

(51) Int. Cl.
*G06T 15/08* (2011.01)
*G06T 3/18* (2024.01)
(Continued)

(52) U.S. Cl.
CPC ................ *G06T 15/08* (2013.01); *G06T 3/18* (2024.01); *G06T 15/20* (2013.01); *G06V 10/25* (2022.01);
(Continued)

(58) Field of Classification Search
CPC ........... G06T 15/08; G06T 3/18; G06T 15/20; G06V 10/25; G06V 10/7747; G06V 20/41; G06V 20/56; G06V 20/64; G06V 10/82
(Continued)

(56) References Cited

U.S. PATENT DOCUMENTS

| | | | |
|---|---|---|---|
| 11,403,807 B2 | 8/2022 | Kim et al. | |
| 2020/0137382 A1* | 4/2020 | Zhao ................... | H04N 13/282 |

(Continued)

FOREIGN PATENT DOCUMENTS

| | | |
|---|---|---|
| WO | 2019073267 A1 | 4/2019 |
| WO | 2022167602 A2 | 8/2022 |

OTHER PUBLICATIONS

Depth field networks for generalizable multi-view scene representation (https://arxiv.org/pdf/2207.14287v1.pdf), dated Jul. 28, 2022.

*Primary Examiner* — Jennifer Mehmood
*Assistant Examiner* — Dustin Bilodeau
(74) *Attorney, Agent, or Firm* — Dinsmore & Shohl LLP

(57) ABSTRACT

Systems and methods described herein support enhanced computer vision capabilities which may be applicable to, for example, autonomous vehicle operation. An example method includes An example method includes training a shared latent space and a first decoder based on first image data that includes multiple images, and training the shared latent space and a second decoder based on second image data that includes multiple images. The method also includes generating a volumetric embedding that is representative of
(Continued)

a novel viewing frame the first scene. Further, the method includes decoding, with the first decoders, the shared latent space with the volumetric embedding, and generating the novel viewing frame of the first scene based on the output of the first decoder.

20 Claims, 10 Drawing Sheets

(51) Int. Cl.

| | |
|---|---|
| *G06T 15/20* | (2011.01) |
| *G06V 10/25* | (2022.01) |
| *G06V 10/774* | (2022.01) |
| *G06V 20/40* | (2022.01) |
| *G06V 20/56* | (2022.01) |
| *G06V 20/64* | (2022.01) |

(52) U.S. Cl.
CPC .......... *G06V 10/7747* (2022.01); *G06V 20/41* (2022.01); *G06V 20/56* (2022.01); *G06V 20/64* (2022.01)

(58) Field of Classification Search
USPC ........................................................ 382/104
See application file for complete search history.

(56) References Cited

U.S. PATENT DOCUMENTS

| | | | |
|---|---|---|---|
| 2020/0286256 A1* | 9/2020 | Houts ................ | G06F 18/2413 |
| 2021/0107397 A1* | 4/2021 | Unterweger .......... | B60Q 1/143 |
| 2021/0248811 A1* | 8/2021 | Shan ...................... | G06N 3/045 |
| 2021/0279952 A1 | 9/2021 | Chen et al. | |
| 2022/0292781 A1* | 9/2022 | Bautista Martin ...... | G06T 15/55 |
| 2023/0033466 A1* | 2/2023 | More ....................... | G06T 7/55 |

* cited by examiner

400

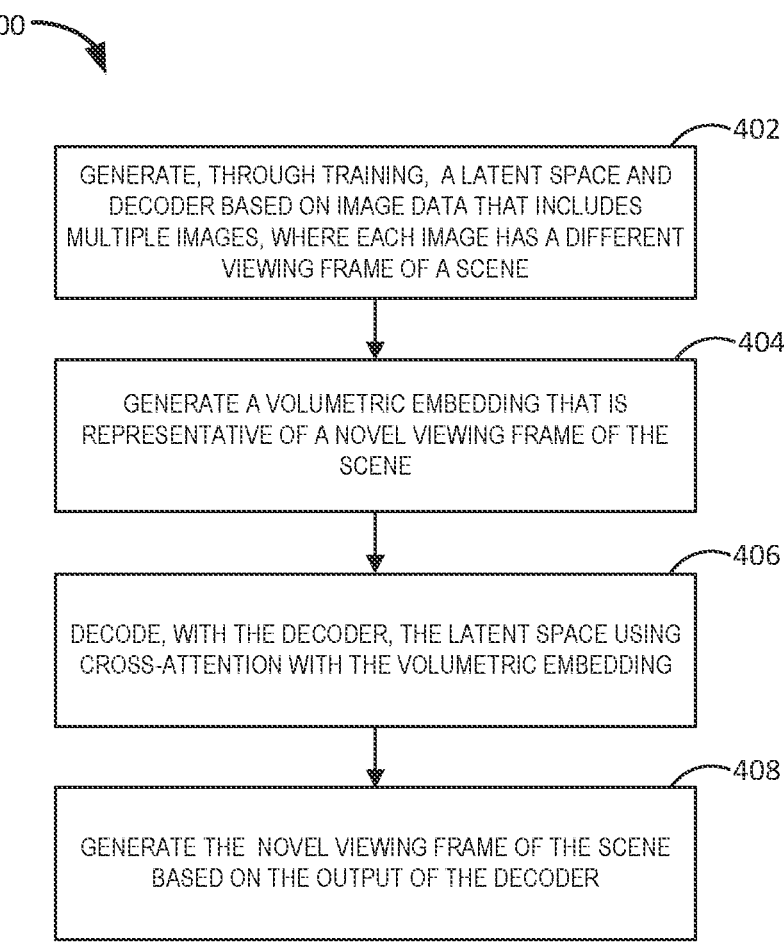

402

GENERATE, THROUGH TRAINING, A LATENT SPACE AND DECODER BASED ON IMAGE DATA THAT INCLUDES MULTIPLE IMAGES, WHERE EACH IMAGE HAS A DIFFERENT VIEWING FRAME OF A SCENE

404

GENERATE A VOLUMETRIC EMBEDDING THAT IS REPRESENTATIVE OF A NOVEL VIEWING FRAME OF THE SCENE

406

DECODE, WITH THE DECODER, THE LATENT SPACE USING CROSS-ATTENTION WITH THE VOLUMETRIC EMBEDDING

408

GENERATE THE NOVEL VIEWING FRAME OF THE SCENE BASED ON THE OUTPUT OF THE DECODER

FIG. 4

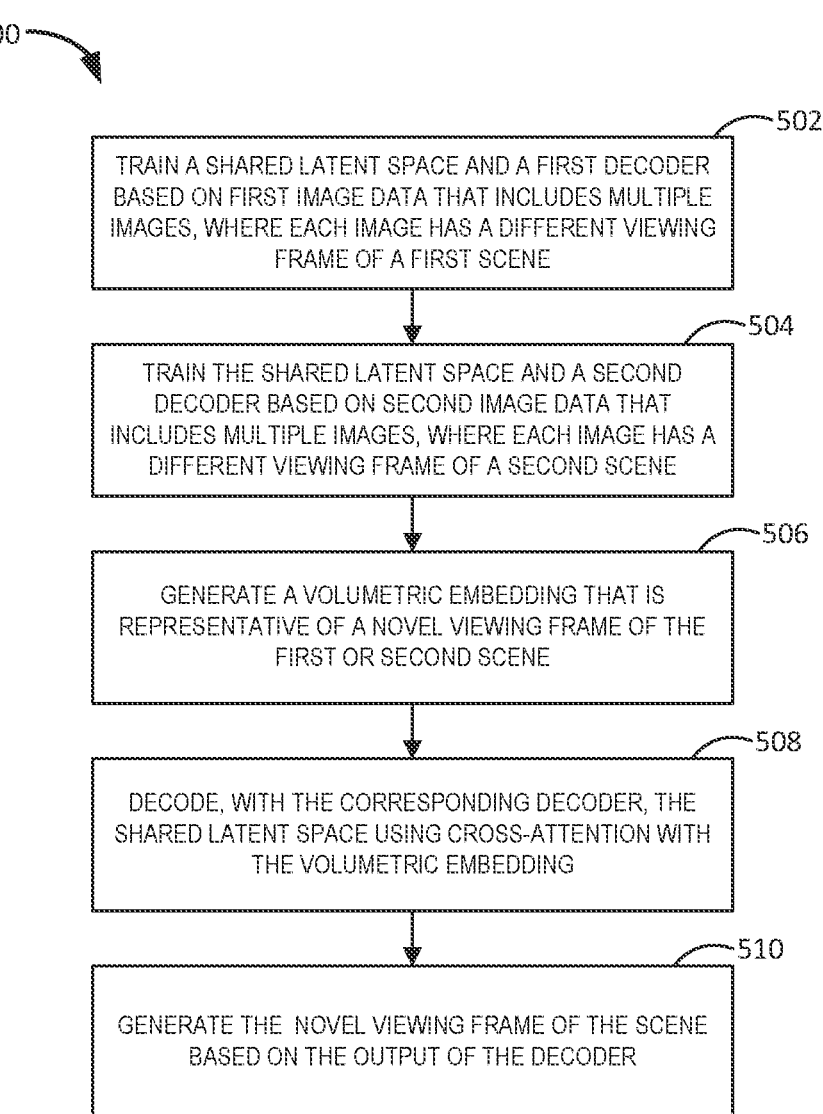

500

502

TRAIN A SHARED LATENT SPACE AND A FIRST DECODER BASED ON FIRST IMAGE DATA THAT INCLUDES MULTIPLE IMAGES, WHERE EACH IMAGE HAS A DIFFERENT VIEWING FRAME OF A FIRST SCENE

504

TRAIN THE SHARED LATENT SPACE AND A SECOND DECODER BASED ON SECOND IMAGE DATA THAT INCLUDES MULTIPLE IMAGES, WHERE EACH IMAGE HAS A DIFFERENT VIEWING FRAME OF A SECOND SCENE

506

GENERATE A VOLUMETRIC EMBEDDING THAT IS REPRESENTATIVE OF A NOVEL VIEWING FRAME OF THE FIRST OR SECOND SCENE

508

DECODE, WITH THE CORRESPONDING DECODER, THE SHARED LATENT SPACE USING CROSS-ATTENTION WITH THE VOLUMETRIC EMBEDDING

510

GENERATE THE NOVEL VIEWING FRAME OF THE SCENE BASED ON THE OUTPUT OF THE DECODER

FIG. 5

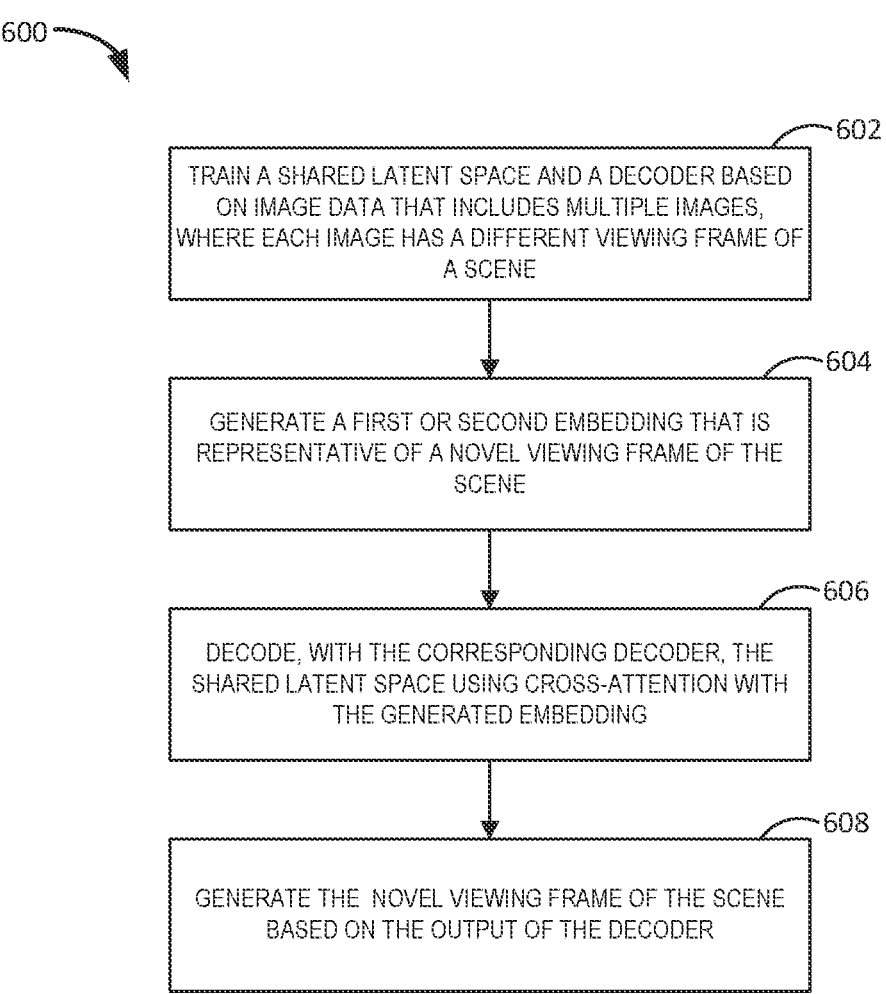

600

602
TRAIN A SHARED LATENT SPACE AND A DECODER BASED ON IMAGE DATA THAT INCLUDES MULTIPLE IMAGES, WHERE EACH IMAGE HAS A DIFFERENT VIEWING FRAME OF A SCENE

604
GENERATE A FIRST OR SECOND EMBEDDING THAT IS REPRESENTATIVE OF A NOVEL VIEWING FRAME OF THE SCENE

606
DECODE, WITH THE CORRESPONDING DECODER, THE SHARED LATENT SPACE USING CROSS-ATTENTION WITH THE GENERATED EMBEDDING

608
GENERATE THE NOVEL VIEWING FRAME OF THE SCENE BASED ON THE OUTPUT OF THE DECODER

*FIG. 6*

SHARED LATENT SPACES FOR VOLUMETRIC RENDERING

RELATED APPLICATIONS

This application claims benefit of U.S. Provisional Application No. 63/382,776 entitled, "DeLiRa: Self-Supervised Depth, Light, and Radiance Fields," filed Nov. 8, 2022, which is herein incorporated by reference in its entirety.

TECHNICAL FIELD

The present disclosure relates to systems and methods supporting enhanced computer vision capabilities which may be applicable to, for example, autonomous vehicle operation.

INTRODUCTION

Computer vision systems perform various acquisition, processing, and analysis tasks using digital images and/or video to extract data from the real-world that can be used to, for example, control autonomous systems. There are several different types of technologies that fall under the larger umbrella of computer vision, including depth synthesis, depth estimation, scene reconstruction, object detection, event detection, video tracking, three dimensional (3D) pose estimation, 3D scene modeling, and motion estimation.

3D reconstruction, the process of inferring 3D geometry form two-dimensional (2D) images, is an important component of computer vision systems. Certain techniques have advanced 3D reconstruction, such as neural fields that parameterize continuous functions in 3D space using neural networks. However, current methods struggle when a large number of diverse camera viewpoints are not available. For example, a lack of diverse set of viewpoints can cause distortions or otherwise create ambiguity in the reconstructed 3D environment. This ambiguity can, for example, make it difficult for a computer vision system to have an accurate assessment of the environment and hinder other systems that rely on that assessment. Additionally, current methods are either imprecise and quick or more detailed and slow and/or computationally intensive.

Autonomous vehicle technology uses computer vision systems. For instance, autonomous vehicles can employ computer vision capabilities and leverage object detection algorithms in combination with advanced cameras and sensors to analyze their surroundings in real-time. As such, there is a need for computer vision systems that are accurate and computationally accessible enough to be deployed on an autonomous vehicle.

SUMMARY

As described herein, a system leverages one or more techniques to improve the quality and efficiency of volumetric rendering in 3D reconstruction to provide, for example, depth analysis for computer vision systems. For example, the system may provide depth analysis when there is sparse diversity in the available images of an object or scene to be reconstructed. In some examples, the techniques include cross-attention decoding, generation of a shared latent space, and/or view warping for training a latent space.

An example method includes training a shared latent space and a first decoder based on first image data that includes multiple images, and training the shared latent space and a second decoder based on second image data that includes multiple images. The method also includes generating a volumetric embedding that is representative of a novel viewing frame the first scene. Further, the method includes decoding, with the first decoders, the shared latent space with the volumetric embedding, and generating the novel viewing frame of the first scene based on the output of the first decoder.

An example system includes a preprocessing platform and a computer vision platform. The preprocessing platform trains a shared latent space and a first decoder based on first image data that includes multiple images, and trains the shared latent space and a second decoder based on second image data that includes multiple images. The computer vision platform generates a volumetric embedding that is representative of a novel viewing frame the first scene, decodes, with the first decoders, the shared latent space with the volumetric embedding, and generates the novel viewing frame of the first scene based on the output of the first decoder.

An example tangible computer readable medium comprising instructions that, when executed, cause a system to train a shared latent space and a first decoder based on first image data that includes multiple images, and train the shared latent space and a second decoder based on second image data that includes multiple images, wherein each image has a difference viewing frame of a second scene. The instructions, when executed, also cause the system to generate a volumetric embedding that is representative of a novel viewing frame the first scene, decode, with the first decoders, the shared latent space with the volumetric embedding, and generate the novel viewing frame of the first scene based on the output of the first decoder.

DESCRIPTION OF THE DRAWINGS

The appended figures depict certain aspects of the one or more embodiments and are therefore not to be considered limiting of the scope of this disclosure.

FIG. 4 is a flowchart of an example method to generate a novel viewing frame for use in a computer vision system based on cross-attention decoders, according to the teachings of this disclosure.

FIG. 5 is a flowchart of an example method to generate a novel view frame for use in a computer vision system based on a shared latent space, according to the teachings of this disclosure.

FIG. 6 is a flowchart of an example method to generate a novel view frame for use in a computer vision system based on a shared latent space, according to the teachings of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Computer vision is technology that is related to the acquisition, processing, and analysis of image data, such as digital images and/or video, for the extraction of a high-level and high dimensional data representing the real world. Differentiable volumetric rendering has become an increasingly popular machine-learning (ML)-based method of 3D reconstruction that generates novel views from a limited set of images. Each image provides a different viewpoint or viewing frame of a scene. A viewpoint or viewing frame refers to the position of the camera in relation to the scene. For example, the novel view may be (i) an image with a viewpoint of a scene that is different from the viewpoints represented by the limited set of images or (ii) a depth map from a different viewpoint of the scene. A popular differentiable volumetric rendering technique uses a neural rendering fields (NeRFs) that have multiple fully connected layers to map input information (e.g., camera geometry, such as origin and viewing direction) into color and density predictions, that are then composited into per-pixel predictions to render an image from a novel viewpoints. However, recovering 3D geometry from 2D information using these volumetric rendering techniques can be difficult when there is not a large number of diverse camera viewpoints in order to converge to the correct geometry. That it, it is difficult to generate an accurate 3D reconstruction of a scene when there is a limited number of views of the scene available.

Examples described herein are directed to volumetric rendering system with a depth, light, and radiance field (DeLiRa) architecture for synthesizing scene information (e.g., visual information, depth information, etc.) at novel viewpoints. Synthesizing scene information enables, for example, interpolation of a depth information beyond the specific viewpoints of the source images. Therefore, the DeLiRa architecture implements functions which can be useful for various computer vision applications for autonomous vehicles, such as predicting depth maps from viewpoints not available in current images. As described herein, the volumetric rendering system includes one or more techniques to, for example, increase accuracy of depth prediction and 3D reconstruction with fewer number of diverse camera viewpoints and/or requiring less computational power. In some examples, the volumetric rendering system includes (i) cross-attention decoding of a trained latent space, (ii) a shared latent space, (iii) a shared latent space joint with learning of depth, light, and/or radiance fields, and/or (iv) a latent space is trained using multi-view photometric warping. The systems and methods related to the DeLiRa architecture as described herein may be implemented with any computer vision system, include the computer vision systems of autonomous and semi-autonomous vehicles (e.g., automobiles, trucks, motorcycles, recreational vehicles, etc.).

Figure 1:
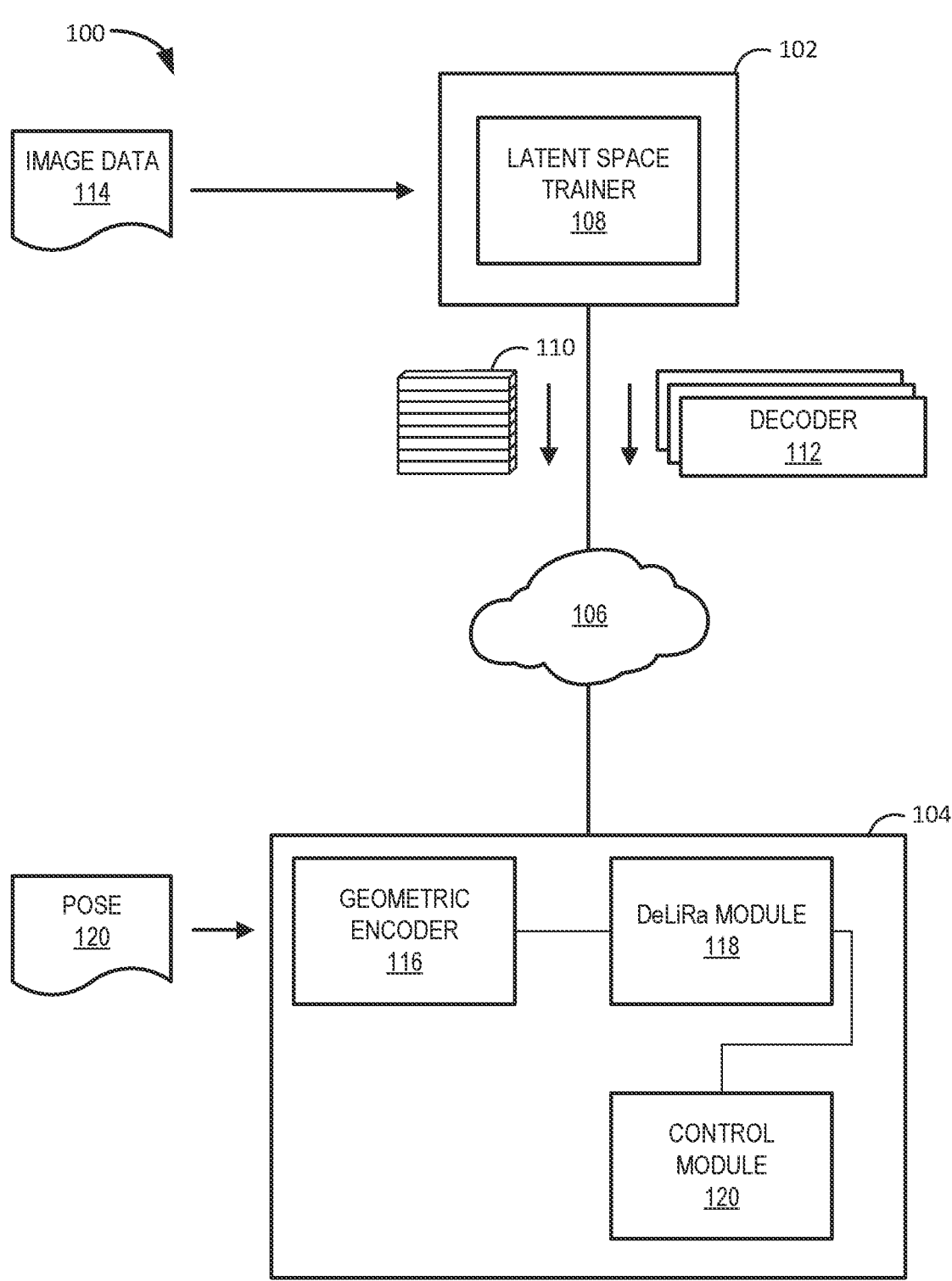
FIG. 1 illustrates a system with which embodiments of the disclosure may be implemented.

FIG. 1 illustrates a volumetric rendering system 100. In the illustrated example, the volumetric rendering system 100 includes a pre-processing platform 102 and a computer vision system 104. The pre-processing platform 102 may include one or more servers or computer platforms (e.g., one or more services operating in a clout environment, a virtualized environment, etc.). In some examples, computer vision system 104 may incorporated into an autonomous vehicle or semi-autonomous vehicle. In some examples, the pre-processing platform 102 and the computer vision system 104 may be located on the same processing platform, such as a processing platform of the vehicle. In the illustrated example, the pre-processing platform 102 and a computer vision system 104 platform are communicatively coupled by a network 106. The network 106 may be any network, such as a cellular data network or a wide area network (WAN). The network 106 may be a public network, such as the Internet; a private network, such as an intranet; or combinations thereof, and may utilize a variety of networking protocols now available or later developed including, but not limited to, TCP/IP-based networking protocols.

In the illustrated example, the pre-processing platform 102 includes a latent space trainer 108. The latent space trainer 108 generates a latent space (S) 110 and one or more decoders 112 based on image data 114. In some example, the latent space trainer 108 generates a latent space (S) 110 and at least one decoder 112 for every set of the image data 114 that represents a scene. The image data 114 includes multiple images representing different viewpoints of a scene. The scene may include an object (e.g., a vehicle, a building, a statue, etc.) or a view of a real-world environment that contains multiples surfaces and objects. As discussed below, a viewpoint may be represented by a 3D vector, defining a camera position and orientation relative to the scene. The image data 114 may include, for example, images of a scene at different viewpoints by cameras of the vehicle or by different vehicles that are later processes. For example, different vehicles may capture images of a scene at, for example, an intersection which may be compiled into image data 114 to be processed.

As described below in connection with FIGS. 2A, 2B, 3A, and 3B below, the latent space trainer 108 calculates camera embeddings from the image data 114 and performs self-supervised learning to train the latent space (S) 110 and the decoder(s) 112. Each embedding represents the corresponding image as a continuous vector that may be used to decode the latent space (S) 110. During training, the camera embeddings of the image data 114 are used to train the latent space (S) 110 and the decoder(s) 112. In some examples, the latent space trainer 108 may generate the latent space (S) 110 as a randomly initialized neural network and input the camera embeddings to a randomized decoder to get an output viewpoint. For each viewpoint in the image data 114, the latent space trainer 108 compares the input viewpoint with the predicted output viewpoint. An image reconstruction loss is calculated between the input viewpoint and the output viewpoint. An optimization algorithm, such as a gradient descent, is applied to the neural network and decoder over some number of epochs until the image reconstruction loss (L) is within a threshold level. In some examples, the latent space trainer 108 uses a volumetric rendering view synthesis loss ($L_S$) according to Equation 1 below.

$$L_S = \left\| \hat{I}_t - I_t \right\|^2 \qquad \text{Equation 1}$$

In Equation 1, for the volumetric rendering view synthesis loss ($L_S$), the latent space trainer 108 uses the Mean Square Error (MSE) objective to supervise the predicted image ($\hat{I}_t$) relative to the target image ($I_t$) (e.g., the image of the image data 114 being reconstructed). The volumetric rendering view synthesis loss ($L_S$) is a single view loss because it directly compares the predicted image ($\hat{I}_t$) with the target image ($I_t$).

In some examples, latent space trainer 108 trains the latent space (S) 110 and the decoder(s) 112 using a multi-view photometric loss ($L_M$) according to Equation 2 below.

$$L_M = L_S + \alpha_P L_P \qquad \text{Equation 2}$$

In Equation 2, the multi-view photometric loss ($L_M$) uses a photometric objective ($L_P$) that estimates contribution of novel views by performing a warping function on the base target image ($I_t$) (e.g., one of the images in the image data 114). The contribution of the photometric objective ($L_P$) may be weighted by a weighting factor ($\alpha_P$) (e.g., a value between (0, 1], etc.). To calculate the photometric objective ($L_P$), for each pixel (u, v) in the base target image ($I_t$), with a predicted depth ($\hat{d}$), the latent space trainer 108 generates projected coordinates (u', v') with a predicted depth ($\hat{d'}$) in a context image ($I_c$) (e.g., an image that represents a novel view for calculating the photometric objective ($L_P$)) via a warping operation as defined in Equation 3 below.

$$\hat{d'} \begin{bmatrix} u' \\ v' \\ 1 \end{bmatrix} = K_c R_{t \to c} \left( K_t^{-1} \begin{bmatrix} u \\ v \\ 1 \end{bmatrix} \hat{d} + t_{t \to c} \right) \qquad \text{Equation 3}$$

In Equation 3, $K_c$ is a known camera 3×3 intrinsic for the context image ($I_c$), $K_t$ is the known pinhole intrinsic for the base target image ($I_t$), and $R_{t \to c}$ is transformation matrix between the position of target image ($I_t$) and the context image ($I_c$). To produce the synthesized target image ($\hat{I}_{ts}$) for the context image ($I_c$), the latent space trainer 108 uses grid sampling with bilinear interpolation to place information from the context image ($I_c$) onto each target pixel of the synthesized target image ($\hat{I}_{ts}$) based on the projected coordinates. The photometric objective ($L_P$) is calculated between the target image ($I_t$) and the synthesized target image ($\hat{I}_{ts}$) according to Equation 4.

$$L_P(I_t, \hat{I}_{st}) = \alpha \frac{1 - SSIM(I_t, \hat{I}_{st})}{2} + (1 - \alpha)\|I_t - \hat{I}_{st}\| \qquad \text{Equation 4}$$

In Equation 4, the photometric objective ($L_P$) is calculated with a weighted Structural Similarity Index (SSIM) function and an L1 loss term. Additionally, a is weight coefficient with a value between 0 and 1. The SSIM function quantifies the difference between two images. The L1 loss term calculates an absolute difference between a prediction and the actual value.

In some examples, because of a large amount of network calls required for volumetric sampling, the latent space trainer 108 uses strided ray sampling to reduce the number of pixels necessary to calculate the photometric objective ($L_P$) while maintaining relatively dense image. This may, for example reduce training times and memory usage while training the latent space (S) 110 and decoder(s) 112. To perform strided ray sampling, predetermined horizontal strides (s w) and vertical strides ($s_h$) are used. Additionally, a random horizontal offset ($o_w \in [0, s_w-1]$) and a random vertical offset ($o_w \in [0, s_h-1]$) are selected to determine the starting point of the sampling process. The resulting rays can be arranged to produce a downsampled image $$(I_t')$$

of resolution $$\left\lfloor \frac{H - o_h}{s_h} \right\rfloor \times \left\lfloor \frac{W - o_w}{s_w} \right\rfloor$$

(where H is number of vertical pixels and W is the number of horizontal pixels of images in the image data 114), with a corresponding predicted image $$(\hat{I}_t')$$

and depth map $$(\hat{D}_t').$$

To compensate for the downsampled image, the camera intrinsic K' is adjusted according to Equation 5.

$$K' = \begin{bmatrix} \dfrac{f_w}{s_w} & 0 & \dfrac{c_w - o_w}{s_w} \\ 0 & \dfrac{f_h}{s_h} & \dfrac{c_h - o_h}{s_h} \\ 0 & 0 & 1 \end{bmatrix} \qquad \text{Equation 5}$$

In Equation 5, wherein $f_w$ and $f_h$ are the focal lengths and $c_w$ and $c_h$ are the principle point offsets of the camera intrinsic K.

At least one of the latent space (S) 110 or the decoder 112 should be independent. Either (i) a latent space (S) 110 is unique for a scene, (ii) the decoder 112 is unique for the scene, or (iii) both the latent space (S) 110 and the decoder 112 are unique for the scene. In some examples, the latent space (S) 110 may be trained with multiple scenes (e.g., multiple sets of the image data 114). In such an example, the latent space trainer 108 may generate the latent space (S) 110 as described above using images from multiple sets of image data 114. However, in such example, the latent space trainer 108 trains a different decoder 112 for each set of the image data 114. In some examples, the latent space trainer 108 may train multiple latent spaces (e.g., the latent space (S) 110 for each of the sets of image data 114), but may train the same decoder 112 to be used with all of the latent spaces 110.

In some examples, the latent space trainer 108 trains the latent space (S) 110 with multiple camera embeddings of the images in the image data 120 so that predictions are learned jointly. For example, the latent space trainer 108 may use the volumetric embeddings and the ray embeddings as described below in connection with FIGS. 2A, 2B, 3A, and 3B. In some such examples, different training epochs may use different combinations of embeddings to train the latent space (S) 110. For example, for a first percentage of the training epochs (e.g., 10%, etc.), the latent space trainer 108 may train the latent space (S) 110 with only ray embeddings. After first percentage of the training epochs, the number of samples using volumetric embeddings increases and the number of sample using ray embeddings decreases until only samples using volumetric embeddings are used. For example, the change in the composition of samples may change after 10 percent of the epochs. As described below, the resulting the latent space (S) 110 may be used in conjunction with different task specific decoders to decode novel viewpoints.

The pre-processing platform 102 provides the latent space(s) 110 and the decoder(s) 112 to the computer vision system 104. In the illustrated example, the computer vision system 104 includes a geometric encoder 116, a DeLiRa module 118, and control module 120. As described below, the geometric encoder 116 generates one or more input embeddings for pose data 122 to generate a novel view. The novel view is an image or a depth prediction at a desired viewpoint of a scene. The pose data 122 may be, for example, based on the orientation of a vehicle with respect to the real-world corollary of the scene. For example, if the scene depicts a tree, the pose data 122 may be based on the orientation of the vehicle with respect to the tree. Input embeddings define an input into the decoder 112 to decode the corresponding latent space (S) 110 for the scene to generate the novel view. As described below, the DeLiRa module 118 generates the novel view based on the input embedding(s) and the latent space (S) 110 using the decoder 112. The control module 120 uses the novel view (e.g., the depth prediction from the novel view) to control a system communicatively coupled to the computer vision system 104, such as one or more motive functions of a vehicle.

Figure 2A:
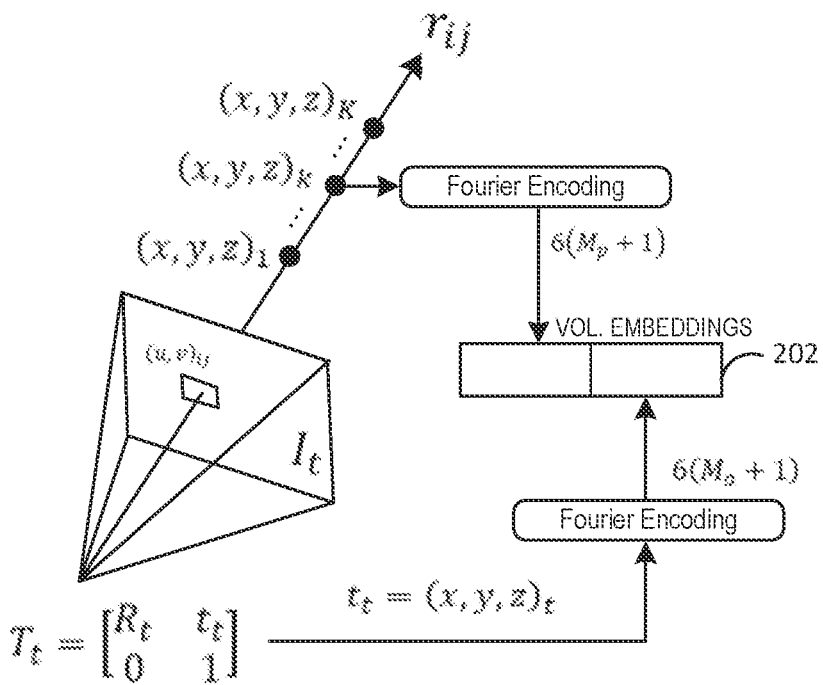
FIGS. 2A and 2B illustrate an example depth, light, and radiance field (DeLiRa) architecture using cross-attention decoding that may be implemented by the system of FIG. 1, according to the teachings of this disclosure.
Figure 2B:
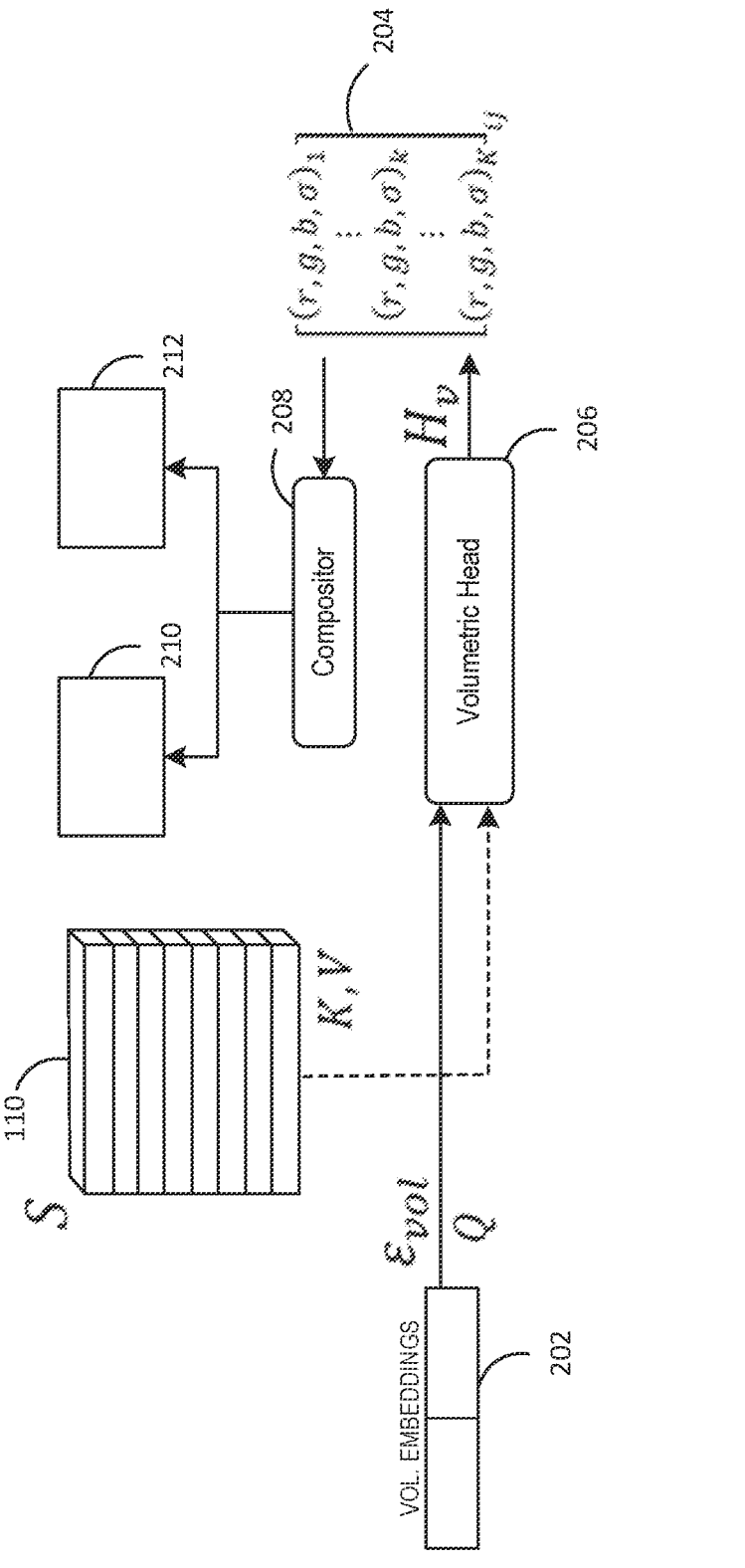

FIGS. 2A and 2B illustrate an example DeLiRa architecture by the pre-processing platform 102 and the computer vision system 104 of FIG. 1. FIG. 2A illustrates the architecture to (i) generate the camera embeddings of the images in the image data 114 during training, and (ii) generate a volumetric embedding 202 for the pose data 122 of FIG. 1 representing a desired novel view of a scene. The embeddings may be generated by a geometric encoder (e.g., the geometric encoder 116 of FIG. 1). Additionally, during training, a latent space trainer (e.g., the latent space trainer 108 of FIG. 1) may generate volumetric embeddings 202 from images in image data (e.g., the image data 114 of FIG. 1) as part of training a latent space (e.g., the latent space (S) 110 of FIG. 1). The volumetric embedding 202 is a vector that represents the pose data 122 as an input into a decoder (e.g., the decoder 112 of FIG. 1) used to decode the latent space (S) 110 to generate the novel view. The volumetric embedding 202 capture multi-view scene geometry (e.g., camera intrinsics and extrinsic s) in a way that can be used by the decoder 112 as an input. For example, let $x_{ij}=(u, v)$ be an image coordinate an image $I_t$ with a desired viewpoint with a target camera t, and with assumed known pinhole 3×3 intrinsics $K_t$, resolution H×W, and 4×4 transformation matrix $T_t$, represented mathematically in Equation 6 below.

$$T_t = \begin{bmatrix} R_t & t_t \\ 0 & 1 \end{bmatrix} \qquad \text{Equation 6}$$

The geometric encoder 116 generates an origin $o_t$ vector and, in some example, a direction $r_{ij}$ vector for a viewing ray of target camera t using Equations 7 and 8 below.

$$o_t = -R_t t_t \qquad \text{Equation 7}$$

-continued
$$r_{ij} = (K_t R_t)^{-1}[u_{ij}, v_{ij}, 1]^T \qquad \text{Equation 8}$$

For volumetric rendering, the pixel is sampled K times along the viewing ray to generate 3D points $x_k=(x, y, z)$ given depth values $z_k$ according to Equation 9.

$$x_{ij}^k = o_t + z_k \bar{r}_{ij} \qquad \text{Equation 9}$$

In some examples, depth values $z_k$ are linearly sampled between a minimum $d_{min}$ and maximum $d_{max}$ range. The origin $o_t$ and sample $$x_{ij}^k$$

vectors are then Fourier-encoded dimension-wise to produce high-dimensional embeddings, origin embedding $\varepsilon_o$ and depth embedding $\varepsilon_x$ respectively, with a mapping according to Equation 10.

$$x \to [x, \sin(f_1 \pi x), \cos(f_1 \pi x), \dots, \sin(f_M \pi x), \cos(f_M \pi x)] \qquad \text{Equation 10}$$

In Equation 10, M is the number of Fourier frequencies used ($M_o$ for the camera origin, $M_r$ for the viewing ray, and the $M_x$ for the 3D point), equally spaced in the interval $$\left[1, \frac{\mu}{2}\right],$$

where $\mu$ is a maximum frequency parameter shared across all dimensions. The volumetric embedding 202 ($\varepsilon_{vol}$) is then calculated according to Equation 11.

$$\varepsilon_{vol} = \varepsilon_o \oplus \varepsilon_x \qquad \text{Equation 11}$$

In Equation 11 above, $\oplus$ represents the concatenation function.

FIG. 2B illustrates an example architecture for a DeLiRa module (e.g., the DeLiRa module 118 of FIG. 1). The DeLiRa module 118 uses cross-attention layers to extract information from the latent space (S) 110, conditioned on volumetric embeddings (e.g., the volumetric embedding 202 of FIG. 2A) being provided as queries. With this approach, all of the latent space (S) 110 is considered simultaneously when generating, for example, volumetric vector output 204. A final fully connected layer is used to project the cross-attention result onto the desired number output channels (e.g., resulting in volumetric vector output 204).

In the illustrated example, the DeLiRa module 118 uses a task specific decoder 206 consisting of one cross-attention layer between the $N_q \times C_q$ queries and the $N_l \times C_l$ latent space (S) 110. The task specific decoder 206 may be an example of the decoders 12 of FIG. 1. The task specific decoder 206 (sometimes referred to as a "volumetric head" or "$H_v$") decodes the latent space (S) 110 with the volumetric embeddings 202 ($\varepsilon_{vol}$) as a 4-dimensional vector (c, σ), where c=(r, g, b) are colors and σ is density. The volumetric vector output 204 is the vector 4-dimensional vector (c, σ). The DeLiRa module 118 uses a sigmoid function to normalize colors between [0, 1], and a rectified linear activation function ("ReLU") to truncate densities to positive values.

To generate per-pixel predictions, the DeLiRa module 118 composites K predictions along its viewing ray, using sampled depth values $$Z_{ij} = \{z_k\}_{k=0}^{K-1}.$$

The resulting per-pixel predicted color $\hat{c}_{ij}$ and depth $\hat{d}_{ij}$ is given by Equations 12 and 13.

$$\hat{c}_{ij} = \sum_{k=1}^{K} w_k c_k \qquad \text{Equation 12}$$

$$\hat{d}_{ij} = \sum_{k=1}^{K} w_k z_k \qquad \text{Equation 13}$$

Per-point weights $w_k$ and accumulated densities $T_k$, given intervals $\delta_k = z_{k+1} - z_k$, are defined as set forth in Equations 14 and 15.

$$w_k = T_k(1 - \exp(-\sigma_k \delta_k)) \qquad \text{Equation 14}$$

$$T_k = \exp\left(\sum_{k'=1}^{K} \sigma_{k'} \delta_{k'}\right) \qquad \text{Equation 15}$$

In the illustrated example, a compositor 208 translates the volumetric vector output 204 into image prediction data 210 and/or density prediction data 212. The image prediction data 210 provides per-pixel color data to create a bitmap of an image with the viewpoint with the desired pose (e.g., based on the pose data 122 of FIG. 1). The density prediction data 212 provides a per-pixel density prediction may map with the viewpoint with the desired pose corresponding to the pose data 122. The density prediction data 212 may be used, for example, by the control module 120 as part of an autonomous drying system.

Figure 3A:
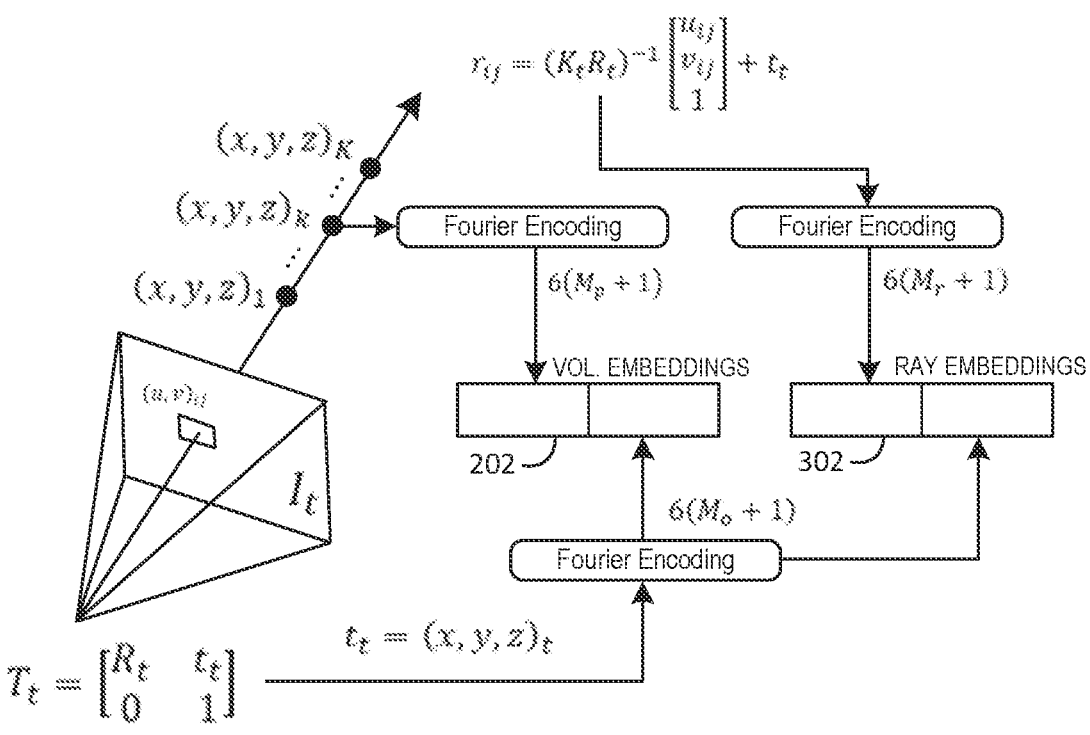
FIGS. 3A and 3B illustrate an example DeLiRa architecture with a shared latent space that may be implemented by the system of FIG. 1, according to the teachings of this disclosure.

FIG. 3A illustrates the architecture to generate the volumetric embedding 202 and ray embeddings 302 for the pose data 122 of FIG. 1 representing a desired novel view of a scene which may be generated by a geometric encoder (e.g., the geometric encoder 116 of FIG. 1). In some examples, as described below, a latent space trainer (e.g., the latent space trainer 108 of FIG. 1) may train a shared latent space for a scene with both volumetric embeddings 202 and ray embeddings 302 and the geometric encoder 116 may only encode ray embeddings 302 to use as queries into the shared latent space. To generate the ray embeddings 302, the geometric encoder 116 Fourier-encodes dimension-wise the origin $o_r$ vector and a ray $\bar{r}_{ij}$ vector to produce high-dimensional embeddings $\varepsilon_o$ and $\varepsilon_r$ respectively, with a mapping according to Equation 10 above. The ray embeddings 302 ($\varepsilon_{ray}$) are then calculated according to Equation 16.

$$\varepsilon_{ray} = \varepsilon_o \oplus \varepsilon_r \qquad \text{Equation 16}$$

Figure 3B:
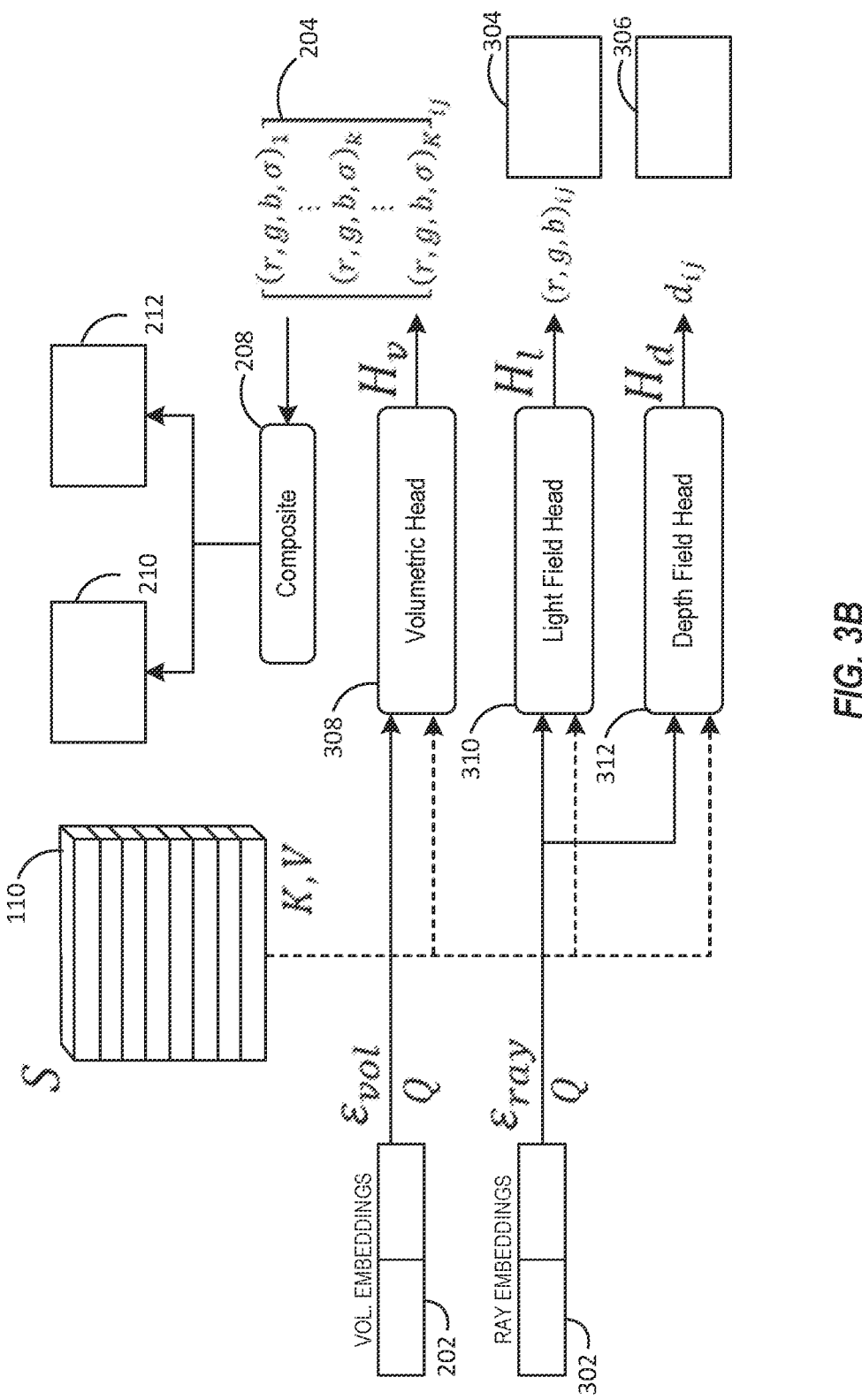

FIG. 3B illustrates an example architecture for a DeLiRa module (e.g., the DeLiRa module 118 of FIG. 1). The DeLiRa module 118 uses cross-attention layers to extract information from the latent space (S) 110, conditioned on volumetric embeddings (e.g., the volumetric embeddings 202 of FIGS. 2A and 3A) and/or ray embeddings (e.g., the ray embeddings 302 of FIG. 3A) being provided as queries. With this approach, all the latent space (S) 110 is considered simultaneously when generating, for example, a volumetric vector output 204, a light field vector output 304, and/or a depth field output 306. A final fully connected layer is used to project the cross-attention result onto the desired number output channels.

In the illustrated example, the DeLiRa module 118 uses one or more task specific decoders 308, 310 and 312 each consisting of one cross-attention layer between the $N_q \times C_q$ queries and the $N_l \times C_l$ latent space (S) 110. In some examples, the task specific decoders 308, 310 and 312 are generated during training when training a shared latent space that is trained using the volumetric embeddings 202 and the ray embeddings 302. A first task specific decoder 308 may be an example of the volumetric head ($H_v$) 206 of FIG. 2B. A second task specific decoder 310 (sometimes referred to as a "light field head" or "$H_L$") decodes ray embeddings 302 ($\varepsilon_{ray}$) to generate the light field vector output 304 as a 3-dimensional vector $\hat{c}_{ij} = (r, g, b)$ containing predicted pixel colors. The DeLiRa module 118 uses a sigmoid function to normalize colors between [0, 1]. A third task specific decoder 312 (sometimes referred to as a "depth field head" or "$H_D$") decodes the ray embeddings 302 ($\varepsilon_{ray}$) to generate the depth field output 306 as a scalar value $d_{ij}$ representing predicted pixel depth. The predicted pixel depth is normalized between a $[d_{min}, d_{max}]$ range.

In some examples, while the latent space trainer 108 may train the latent space (S) 110 with the task specific decoders 308, 310 and 312, the DeLiRa module 118 may, for example, use only one of the task specific decoders 308, 310 and 312 depending on the output 204, 304 and 306 that the control module 120 uses. Even when the volumetric head ($H_v$) 206 is not used by the DeLiRa module 118, training the latent space (S) 110 with both the volumetric embeddings 202 and the ray embeddings 302 may provide higher accuracy for the light field vector output 304 and the depth field output 306 compared to when the volumetric embeddings 202 are not used to train the latent space (S) 110. The radiant information provided by the volumetric embeddings 202 enhances, for example, the depth prediction. For example, the control module 120 may use the depth field output 306. In such am example, the geometric encoder 116 may generate the ray embeddings 302 and the DeLiRa module 118 may use the depth field head ($H_D$) 312.

FIG. 4 is a flowchart of an example method 400 to generate a novel viewing frame based on cross-attention decoders. The method 400 may be implemented by, for example, the pre-processing platform 102 and computer vision system 104 of FIG. 1. Method 400 begins at step 402 with generating, by the latent space trainer 108, through self-supervised training, a latent space (e.g., the latent space (S) 110 of FIGS. 1, 2B, and 3B) and decoder (e.g., the volumetric head ($H_v$) 206 of FIGS. 2B and 3B) based on image data (e.g., image data 114 of FIG. 1) that includes multiple images, where each image has a different viewing frame of a scene.

The method 400 continues at step 404 with generating, by the computer vision system 104, a volumetric embedding (e.g., the volumetric embeddings 202 of FIGS. 2A, 2B, 3A, and 3B) that is representative of a novel viewpoint of the scene. For example, the computer vision system 104 may receive a pose (e.g., the pose data 122 of FIG. 1) or other orientation data that provides an origin and a direction that defines the desired novel viewpoint.

The method 400 continues at step 406 with decoding, with a cross-attention decoder (e.g., the decoder 112 of FIG. 1, the task specific decoder 206 of FIG. 2B, etc.), the latent space (S) 110 using cross-attention with the volumetric embedding 202.

The method 400 continues at step 408 with generating, by the computer vision system 104, the novel viewpoint based on the output of the decoder. In some examples, the novel viewpoint may be an image. Additionally or alternatively, in some examples, the novel viewpoint may be a depth map that predict distances between the novel viewpoint and the object(s) in the scene.

FIG. 5 illustrates a flowchart of an example method 500 to generate a novel viewing frame based on a shared latent space. The method 500 may be implemented by, for example, the latent space trainer 108 and computer vision system 104 of FIG. 1. Method 500 begins at step 502 with training, by the latent space trainer 108, through self-supervised training, a shared latent space (e.g., the latent space (S) 110 of FIGS. 1, 2B, and 3B) and a first decoder (e.g., the volumetric head ($H_v$) 206 of FIGS. 2B and 3B) based on first image data that includes multiple images, where each image has a different viewing frame of a first scene.

The method 500 continues at step 504 with training, by the latent space trainer 108, through self-supervised training, the shared latent space (S) 110 and a second decoder (e.g., the volumetric head ($H_v$) 206 of FIGS. 2B and 3B) based on second image data that includes multiple images, where each image has a different viewing frame of a second scene. In such examples, the shared latent space (S) 110

The method 500 continues at step 506 with generating, by the computer vision system 104, a volumetric embedding (e.g., the volumetric embeddings 202 of FIGS. 2A, 2B, 3A, and 3B) that is representative of a novel viewpoint of the first or second scene. For example, the computer vision system 104 may receive a pose (e.g., the pose data 122 of FIG. 1) that (i) specifies a scene (e.g., the first or second scene) and (ii) provides an origin and a direction that defines the desired novel viewpoint in the selected.

The method 500 continues at step 508 with decoding, with the decoder that corresponds with the selected scene (e.g., the decoder 112 of FIG. 1, the task specific decoder 206 of FIG. 2B, etc.), the shared latent space (S) 110 using cross-attention with the volumetric embedding 202.

The method 500 continues at step 510 with generating, by the computer vision system 104, the novel viewpoint based on the output of the decoder. In some examples, the novel viewpoint may be an image. Additionally or alternatively, in some examples, the novel viewpoint may be a depth map that predict distances between the novel viewpoint and the object(s) in the scene.

FIG. 6 illustrates a flowchart of an example method 600 to generate a novel viewing frame based on a shared latent space. The method 600 may be implemented by, for example, the latent space trainer 108 and computer vision system 104 of FIG. 1. Method 600 begins at step 602 with training, by the latent space trainer 108, through self-supervised training, a shared latent space (e.g., the latent space (S) 110 of FIGS. 1, 2B, and 3B) and at least one decoder (e.g., the volumetric head ($H_v$) 206 of FIGS. 2B and 3B, the light field head ($H_L$) 310 and the depth field head ($H_D$) 312 of FIG. 3B) based on image data that includes multiple images, where each image has a different viewing frame of a scene. The latent space trainer 108 trains the shared latent space (S) 110 using at least two geometric embeddings. In some examples, the latent space trainer 108 trains the shared latent space (S) 110 using volumetric embeddings (e.g., the volumetric embeddings 202 of FIGS. 2A, 2B, 3A, and 3B) and ray embeddings (e.g., the ray embeddings 302 of FIGS. 3A and 3B). The latent space trainer 108 may train the shared latent space (S) 110 using multiple decoders, but may only make one decoder available to the computer vision system 104. For example, the latent space trainer 108 may train the shared latent space (S) 110 using (i) volumetric embeddings with a volumetric head ($H_v$) and (ii) ray embeddings with a depth field head ($H_D$). In such an example, the latent space trainer 108 may provide the shared latent space (S) 110 and the depth field head ($H_D$).

Method 600 continues at step 604 with generating, by the computer vision system 104, an embedding that is representative of a novel viewing frame of the scene. The embedding corresponds to the decoder provided by the latent space trainer 108. For example, if the latent space trainer 108 provides the depth field head ($H_D$) 312 or the light field head ($H_L$) 310, the computer vision system 104 generates a ray embedding 302.

The method 600 continues at step 606 with decoding the latent space (S) 110 with the decoder provided by the latent space trainer 108.

The method 600 continues at step 608 with generating, by the computer vision system 104, the novel viewpoint based on the output of the decoder. In some examples, the novel viewpoint may be an image. Additionally or alternatively, in some examples, the novel viewpoint may be a depth map that predict distances between the novel viewpoint and the object(s) in the scene.

Figure 7:
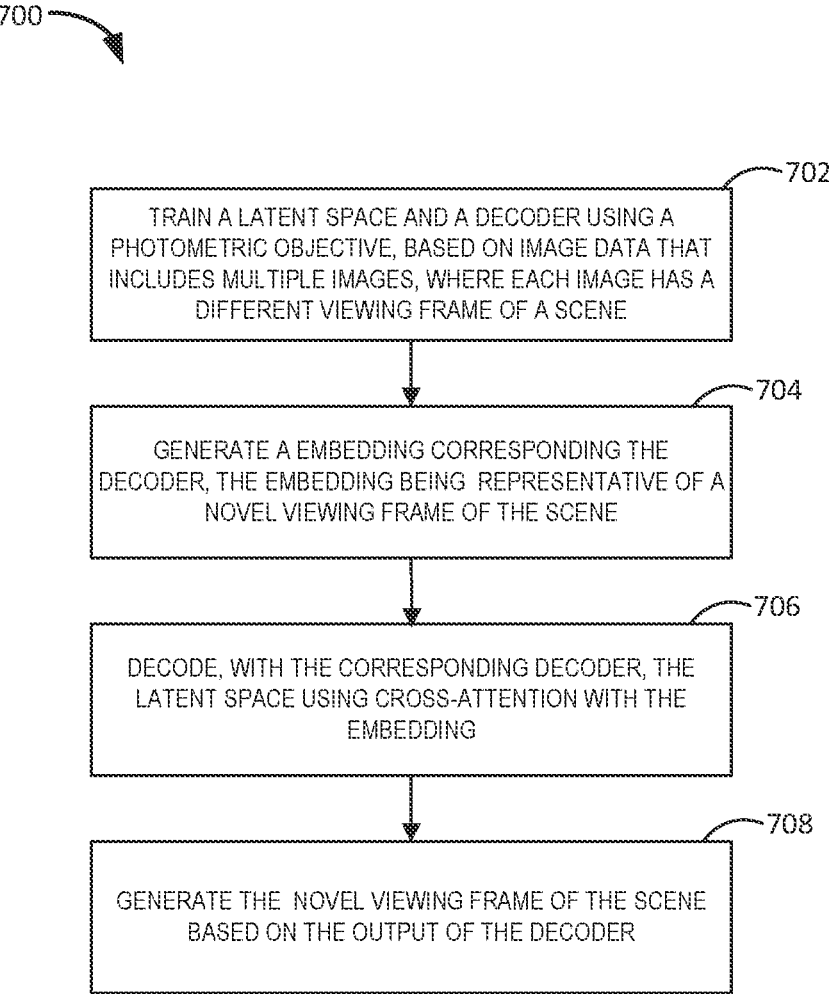
FIG. 7 is a flowchart of an example method to generate a novel view frame for use in a computer vision system based on a latent space trained using constructed views of a scene, according to the teachings of this disclosure.

FIG. 7 is a flowchart of an example method 700 to generate a novel viewing frame based on cross-attention decoders. The method 700 may be implemented by, for example, the latent space trainer 108 and computer vision system 104 of FIG. 1. Method 400 begins at step 402 with generating, by the latent space trainer 108, through self-supervised training, a latent space (e.g., the latent space (S) 110 of FIGS. 1, 2B, and 3B) and decoder (e.g., the volumetric head ($H_v$) 206 of FIGS. 2B and 3B, the light field head ($H_L$) 310 and the depth field head ($H_D$) 312 of FIG. 3B) based on image data (e.g., image data 114 of FIG. 1) that includes multiple images, where each image has a different viewing frame of a scene. To train the latent space the latent space (S) 110, the latent space trainer 108 using a multi-view photometric loss that includes a photometric objective.

Method 700 continues at step 704 with generating, by the computer vision system 104, an embedding that is representative of a novel viewing frame of the scene. The embedding corresponds to the decoder provided by the latent space trainer 108. For example, if the latent space trainer 108 provides the depth field head ($H_D$) 312 or the light field head ($H_L$) 310, the computer vision system 104 generates a ray embedding 302.

The method 700 continues at step 706 with decoding the latent space (S) 110 with the decoder provided by the latent space trainer 108.

The method 700 continues at step 708 with generating, by the computer vision system 104, the novel viewpoint based on the output of the decoder. In some examples, the novel viewpoint may be an image. Additionally or alternatively, in some examples, the novel viewpoint may be a depth map that predict distances between the novel viewpoint and the object(s) in the scene.

While FIGS. 4, 5, 6, and 7 illustrated flowcharts of various methods to generate a novel viewing frames, the techniques described therein may be combined in any combination.

Figure 8:
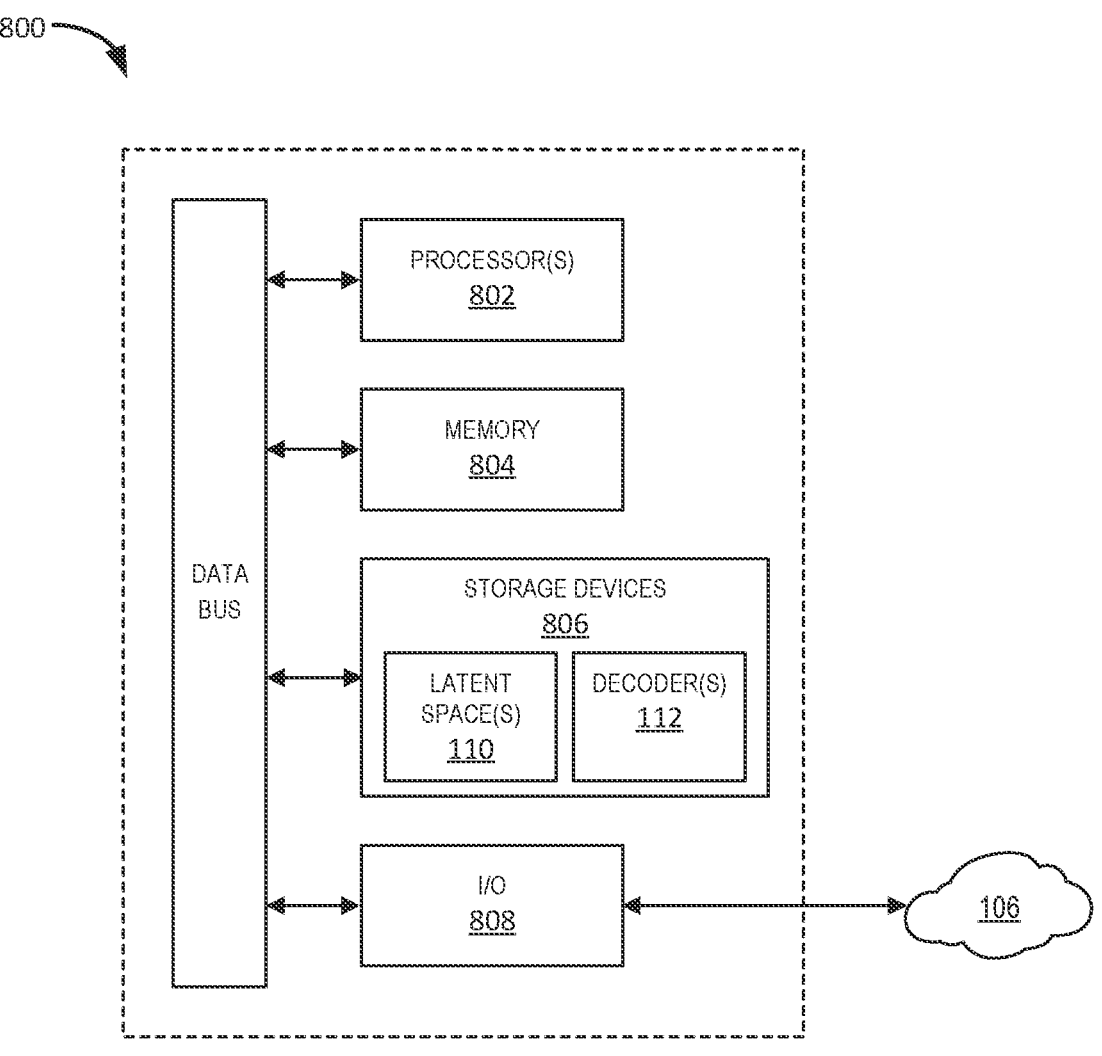
FIG. 8 illustrates an example an example computing system with which embodiments may be implemented.

FIG. 8 illustrates a computing system 800 capable of executing the instructions to implement the methods of FIGS. 4, 5, 6, and 7. The computing system 800 may be, for example, a desktop, laptop or notebook computer, a mobile device (e.g., smartphone, tablet, headset, etc.), workstations, server, or computing system of a vehicle (e.g., an autonomous control unit, a telematics unit, a navigation control unit, etc.). In the illustrated example, the computing system 800 includes a processor 802, memory 804, storage 806, and input/output (I/O) devices 808.

The processor or controller 802 may be any suitable processing device or set of processing devices such as, but not limited to: a microprocessor, a controller-based platform with multiple processing cores, a suitable integrated circuit, one or more field programmable gate arrays (FPGAs), and/or one or more application-specific integrated circuits (ASICs).

The memory 804 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and/or read-only memory. In some examples, the memory 804 includes multiple kinds of memory, particularly volatile memory and non-volatile memory. The storage 806 includes high-capacity storage devices, such as hard drives, tape drives, and/or solid state drives, etc. In the illustrated example, the storage 806 includes a latent space (e.g., the latent space (S) 110 of FIG. 1) and one or more decoders (e.g., the decoders of FIG. 1).

The memory 804 and storage 806 are computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 804, the storage 806, and/or within the processor 802 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals, to exclude transitory signals, and to exclude transmission media. As used herein, the term "non-transitory" refers to storing information on the computer readable medium for any duration (e.g., permanently, for long durations (e.g., minutes, days, etc.), for temporarily buffering and/or for caching, etc.).

The example input devices 808 include any suitable communication device that facilitates communication with a pre-processing platform (e.g., the pre-processing platform 102 of FIG. 1) over an external network (e.g., the network 106 of FIG. 1). The external network(s) may be a public network, such as the Internet; a private network, such as an intranet; or combinations thereof, and may utilize a variety of networking protocols now available or later developed including, but not limited to, TCP/IP-based networking protocols.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. I, should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
training a shared latent space and a first decoder based on first image data that includes multiple images, wherein each image has a different viewing frame of a first scene;
training the shared latent space and a second decoder based on second image data that includes multiple images, wherein each image has a different viewing frame of a second scene;
generating a volumetric embedding that is representative of a novel viewing frame the first scene;
decoding, with the first decoder, the shared latent space with the volumetric embedding; and
generating the novel viewing frame of the first scene based on the output of the first decoder.

2. The method of claim 1, wherein the volumetric embedding is a concatenation of an origin embedding and a depth embedding.

3. The method of claim 1, wherein the novel viewing frame includes a predicted depth map of the first scene.

4. The method of claim 3, wherein the predicted depth map is used to control at least one function of a vehicle.

5. The method of claim 1, wherein the novel viewing frame includes a bitmap of a novel image from a perspective of the novel viewing frame.

6. The method of claim 1, further comprising:
generating a second volumetric embedding that is representative of a second novel viewing frame the second scene;
decoding, with the second decoder, the shared latent space with the second volumetric embedding; and
generating the second novel viewing frame of the second scene based on the output of the second decoder.

7. The method of claim 6, wherein the second novel viewing frame includes a second predicted depth map of the second scene.

8. A system comprising:
a preprocessing platform, comprising at least one processor and memory, configured to:
train a shared latent space and a first decoder based on first image data that includes multiple images, wherein each image has a different viewing frame of a first scene;
train the shared latent space and a second decoder based on second image data that includes multiple images, wherein each image has a different viewing frame of a second scene;

a computer vision platform configured to:
generate a volumetric embedding that is representative of a novel viewing frame the first scene;
decode, with the first decoder, the shared latent space with the volumetric embedding; and
generate the novel viewing frame of the first scene based on the output of the first decoder.

9. The system of claim 8, wherein the volumetric embedding is a concatenation of an origin embedding and a depth embedding.

10. The system of claim 8, wherein the novel viewing frame includes a predicted depth map of the first scene.

11. The system of claim 10, wherein the predicted depth map is used to control at least one function of a vehicle.

12. The system of claim 8, wherein the novel viewing frame includes a bitmap of a novel image from a perspective of the novel viewing frame.

13. The system of claim 8, wherein the computer vision platform is further configured to:
generate a second volumetric embedding that is representative of a second novel viewing frame the second scene;
decode, with the second decoder, the shared latent space with the second volumetric embedding; and
generate the second novel viewing frame of the second scene based on the output of the second decoder.

14. The system of claim 13, wherein the second novel viewing frame includes a second predicted depth map of the second scene.

15. A non-transitory computer readable medium comprising instructions that, when executed, cause a system to:
train a shared latent space and a first decoder based on first image data that includes multiple images, wherein each image has a different viewing frame of a first scene;
train the shared latent space and a second decoder based on second image data that includes multiple images, wherein each image has a different viewing frame of a second scene;
generate a volumetric embedding that is representative of a novel viewing frame the first scene;
decode, with the first decoder, the shared latent space with the volumetric embedding; and
generate the novel viewing frame of the first scene based on the output of the first decoder.

16. The computer readable medium of claim 15, wherein the volumetric embedding is a concatenation of an origin embedding and a depth embedding.

17. The computer readable medium of claim 15, wherein the novel viewing frame includes a predicted depth map of the first scene.

18. The computer readable medium of claim 17, wherein the predicted depth map is used to control at least one function of a vehicle.

19. The computer readable medium of claim 15, wherein the novel viewing frame includes a bitmap of a novel image from a perspective of the novel viewing frame.

20. The computer readable medium of claim 15, wherein the instructions further cause the system to:
generate a second volumetric embedding that is representative of a second novel viewing frame the second scene;
decode, with the second decoder, the shared latent space with the second volumetric embedding; and
generate the second novel viewing frame of the second scene based on the output of the second decoder.

* * * * *